United States Patent Office 3,549,547
Patented Dec. 22, 1970

3,549,547
STABILIZED 1,1,1-TRICHLOROETHANE COMPOSITION
Leighton S. McDonald, Angleton, Tex., and Clarence R. Crabb, Elkgrove Village, Ill., assignors to The Dow Chemical Company, Midland, Mich., a corporation of Delaware
No Drawing. Filed Dec. 5, 1967, Ser. No. 688,014
Int. Cl. C09d 9/00; C11d 7/50; C23g 5/02
U.S. Cl. 252—171                                    6 Claims

ABSTRACT OF THE DISCLOSURE

This invention relates to a composition of 1,1,1-trichloroethane stabilized with minor amounts of cis or trans 1,2-dimethoxy ethylene or mixtures thereof and to a process for preventing deterioration of 1,1,1-trichloroethane in contact with aluminum metal by intimately admixing with such 1,1,1-trichloroethane a stabilizing amount of cis or trans 1,2-dimethoxy ethylene or mixtures thereof.

---

The present invention relates to a new and useful composition of matter and more particularly relates to a stabilized 1,1,1-trichloroethane composition suitable for use in contact with aluminum.

It is now well established that 1,1,1-trichloroethane is a very useful and highly versatile industrial solvent. It is likewise well known that 1,1,1-trichloroethane is the most readily degradable of the chlorinated hydrocarbons when in contact with aluminum and that such degradation occurs whether the solvent is hot or cold and whether the metal contact occurs in the vapor or liquid phase. In order for the art to enjoy the benefits of this highly useful and versatile solvent, there is a continuing need to find substances which will stabilize 1,1,1-trichloroethane in the presence of aluminum.

It is therefore an object of this invention to provide a stabilized 1,1,1-trichloroethane composition. A further object of this invention is to provide a method whereby 1,1,1-trichloroethane can be prevented from deteriorating in liquid phase contact with aluminum. A further object is to provide a process for the degreasing of metals by contacting such metals with a liquid phase stabilized methyl chloroform. These and other objects and advantages of the present invention will become apparent on the reading of the following detailed specification.

In accordance with the present invention, 1,1,1-trichloroethane is stabilized by the addition thereto of from about 0.5 to about 10% by volume of cis 1,2-dimethoxy ethylene or trans 1,2-dimethoxy ethylene or a mixture thereof. A concentration of from about 1 to about 5 volume percent of such stabilizers has generally been found to be preferable, however. At concentrations below 0.5 volume percent of the 1,2-dimethoxy ethylene stabilizer, the effectiveness of such stabilizer begins to decrease rapidly. Concentration in excess of 10% may be employed but no additional advantage is gained by employing such higher concentrations.

The compositions of this invention are excellent solvents useful as carrier vehicles for other organic materials and as liquid solvents to remove oil, grease and the like from metal parts which contain aluminum. Such solvent compositions may be used hot or cold in the presence of aluminum, aluminum alloys or other aluminum-containing metals without any substantial amount of aluminum-induced solvent decomposition occurring.

After use as a carrier vehicle or oil and grease solvent, the stabilized 1,1,1-trichloroethane composition of this invention is easily recovered by distillation. Due to its boiling point, the inhibitor is recovered simultaneously with the 1,1,1-trichloroethane and the stabilized solvent is therefore usually available for reuse with little or no additional stabilizer needed.

EXAMPLE 1

Into a sample of uninhibited 1,1,1-trichloroethane was added 2% by volume of 1,2-dimethoxy ethylene containing 80 weight percent cis isomer and 20 weight percent of trans isomer. A strip of 24S aluminum was placed beneath the surface of the liquid and scratched deeply with a metal point. No reaction occurred. The sample containing the aluminum strip was then heated to a temperature near its boiling point and an additional scratch was made on the aluminum strip. At this temperature a slight reaction was observed along the freshly made scratch on the aluminum test strip, however, the reaction ceased in 20 seconds and no further reaction had occurred at the end of 168 hours.

In a like manner 4 volume percent of 1,2-dimethoxy ethylene containing 80% cis isomer and 20% trans isomer was added to a sample of uninhibited 1,1,1-trichloroethane. The same tests were conducted but no reaction was observed in either the hot or the cold methyl chloroform during the 168 hour test period. Substantially the same results are achieved when the pure cis or trans isomer of 1,2-dimethoxy ethylene is employed.

As a control, an uninhibited sample of 1,1,1-trichloroethane was employed. To such 1,1,1-trichloroethane was added a strip of 24S aluminum which was scratched with a metal point beneath the surface of the 1,1,1-trichloroethane. Reaction begain to occur immediately. The metal strip was consumed and the 1,1,1-trichloroethane rapidly decomposed giving off copious quantities of HCl.

EXAMPLE 2

Into a sample of uninhibited 1,1,1-trichloroethane was added various percentages of 1,2-dimethoxy ethylene, 1,2-dimethoxy ethane or 1,2-diethoxy ethane. Strips of aluminum were then immersed below the liquid and scratched four times at room temperature with a metal point to determine whether the 1,1,1-trichloroethane was sufficiently inhibited to prevent reaction with the aluminum at the site of the scratch. If no reaction occurred or if the reaction failed to continue, the 1,1,1-trichloroethane was heated to its boiling point and an aluminum strip was again scratched below the surface of the liquid. A summary of the tests and results are shown below.

| Additive | Vol., percent | Temperature | Metal, Aluminum | Remarks |
|---|---|---|---|---|
| 1,2-dimethoxy ethylene (mixed isomers). | 4 | Room | 2024 | No reaction. |
| | 4 | do | 1100 | Do. |
| | 4 | Boiling point | 2024 | Do. |
| | 4 | do | 1100 | Do. |
| | 3 | Room | 2024 | Slow reaction which stops. |
| | 3 | do | 1100 | Do. |
| | 3 | Boiling point | 2024 | Do. |
| | 3 | do | 1100 | Do. |
| | 2 | Room | 2024 | Do. |
| | 2 | do | 1100 | Do. |
| | 2 | Boiling point | 2024 | Do. |
| | 2 | do | 1100 | Do. |
| 1,2-dimethoxy ethane | 4 | Room | 2024 | Reaction begins immediately and continues to destruction of solvent and metal. |
| | 4 | do | 1100 | No reaction. |
| | 4 | Boiling point | 1100 | Reaction begins immediately and continues to destruction of solvent and metal. |
| | 3 | Room | 2024 | Do. |
| | 3 | do | 1100 | Do. |
| 1,2-diethoxy ethane | 4 | do | 2024 | Do. |
| | 4 | do | 1100 | Do. |

Various modification can be made in the present invention without departing from the spirit or scope thereof for it is understood that we limit ourselves only as defined in the appended claims.

We claim:
1. 1,1,1-trichloroethane containing as the essential stabilizer against aluminum-induced liquid phase deterioration from about 0.5 to about 10% by volume of cis 1,2-dimethoxy ethylene or trans 1,2-dimethoxy ethylene or a mixture thereof.

2. The composition of claim 1 wherein the 1,2-dimethoxy ethylene stabilizer is present in an amount of from about 1 to about 5 volume percent.

3. A method for preventing the deterioration of 1,1,1-trichloroethane in liquid phase contact with aluminum comprising maintaining in intimate admixture with said 1,1,1-trichloroethane while in contact with aluminum metal from about 0.5 to about 10% by volume of cis 1,2-dimethoxy ethylene or trans 1,2-dimethoxy ethylene or a mixture thereof.

4. The process of claim 3 wherein the stabilizer added thereto is present in an amount of from about 1 to about 5 percent by volume.

5. A process for the degreasing of aluminum-containing metals which comprises contacting such metals with a stabilized 1,1,1-trichloroethane composition wherein said 1,1,1-trichloroethane contains, in admixture therewith, from about 0.5 to about 10% by volume of cis 1,2-dimethoxy ethylene or trans 1,2-dimethoxy ethylene or a mixture thereof.

6. The process of claim 5 wherein the 1,2-dimethoxy ethylene stabilizer is present in an amount of from about 2 to about 5 percent by volume.

References Cited

UNITED STATES PATENTS 3,128,315   4/1964   Hardies _____ 252—171
3,281,480   10/1966   Hardies _____ 252—171

LEON D. ROSDOL, Primary Examiner

W. E. SCHULZ, Assistant Examiner

U.S. Cl. X.R.

252—364; 260—652.5